United States Patent
Lack (10) Patent No.: US 7,431,835 B2
(45) Date of Patent: Oct. 7, 2008

(54) PORTABLE WATER QUALITY MONITORING AND TREATMENT SYSTEM

(75) Inventor: Dennis M. Lack, Bakersfield, CA (US)

(73) Assignee: Western Oilfields Supply Co., Bakersfield, CA (US)

( * ) Notice: Subject to any disclaimer, the term of this patent is extended or adjusted under 35 U.S.C. 154(b) by 515 days.

(21) Appl. No.: 11/257,710

(22) Filed: Oct. 25, 2005

(65) Prior Publication Data

US 2007/0090056 A1    Apr. 26, 2007

(51) Int. Cl.
 *B01D 35/00* (2006.01)
(52) U.S. Cl. ................ 210/205; 210/263; 210/743; 210/745; 210/241
(58) Field of Classification Search .......... 210/241, 210/743, 745, 205, 263
See application file for complete search history.

(56) References Cited

U.S. PATENT DOCUMENTS 4,839,061 A * 6/1989 Manchak, Jr. et al. ....... 210/743

OTHER PUBLICATIONS

Use Designations for Chitosan-Enhaned Sand Filtration, dated Feb. 26, 2004 (Natural Site Solutions, LLC (NSS)), pp. 1-13.
Chitosan-Enhanced Sand Filtration System Bid Specification for Line items 2 and 3, dated Jul. 19, 2004—Natural Site Solutions, pp. 1-2.
Drawing entitled Microsoft Building 36—Stormwater Treatment System, dated Aug. 15, 2002—Natural Site Solutions.
Drawing entitled Figure 3-2 Sampling Location Diagram, dated Oct. 2003—Natural Site Solutions.
Drawing entitled Figure—Sampling Location Diagram, Rev. 03 Jan. 12, 2004—Natural Site Solutions.

* cited by examiner

*Primary Examiner*—Chester T. Barry
(74) *Attorney, Agent, or Firm*—Holland & Knight LLP; Richard E. Lyon, Jr.

(57) ABSTRACT

A portable system for on-site monitoring and treatment of water comprising a protective enclosure adapted to be positioned proximate a site of collected water, an internal fluid flow system disposed within the enclosure comprising a first conduit extending from a dirty water inlet on the enclosure to a pair of dirty water outlets and a second conduit extending from a return water inlet on the enclosure to a filtered water outlet and a clean water outlet. Probes are provided in the conduits for monitoring fluid parameters therein and communicating those parameters to a controller within the enclosure. The controller compares the measured parameter levels with predetermined acceptable levels and actuates valve members in said conduits in response to the measured parameter levels to selectively communicate the respective conduits with respective outlets for the treatment of water passing through the system.

59 Claims, 7 Drawing Sheets

PORTABLE WATER QUALITY MONITORING AND TREATMENT SYSTEM

BACKGROUND OF THE INVENTION

The present invention relates to a portable system for the continuous on-site and real time unmanned monitoring and treatment of fluids prior to the off-site discharge of the fluid. More particularly, the system provides on-site and real time monitoring with data logging capability and treatment of pH levels, turbidity and other desired fluid parameters of water collected in retention ponds and other sites, particularly collected storm water run-off at construction sites and other industrial locations, such as refineries and power plants. Because of the high turbidity generally found in such water, it is frequently necessary that the water be treated prior to being discharged on or off-site (i.e., returned to the ground or emptied into a stream, river or lake). Indeed, the State of Washington has enacted regulations prohibiting the removal of such water from a construction site until it meets certain clarity standards.

The typical methods heretofore in use for monitoring and treating storm water run-off collected at such sites is a batch process in which: chemicals may be injected into the water to accelerate the settling out of suspended solids; the water is placed in a holding tank where the suspended solids settle out; samples are taken for testing and the cycle is repeated until acceptable parameters of clarity are obtained. The water is then released. This process is slow and costly. The present invention allows the monitoring and treatment of the water to be conducted on-site and unmanned in a continuous process, resulting in reduced monitoring and treatment time and labor and substantial economic savings.

SUMMARY OF THE INVENTION

Briefly, the present invention comprises a portable system particularly adapted for the unmanned continuous on-site and real time monitoring with data logging and treatment of water capability containing or potentially containing high levels of suspended solids such as the storm water run-off from construction and other industrial locations. The system can also be used for the on-site monitoring and treatment of other fluid parameters such as pH, oxidation-reduction potential and dissolved oxygen levels.

The monitoring and treatment system of the present invention preferably is at least partially contained in a protective enclosure and comprises a dirty water inlet on the exterior of the enclosure adapted to be communicated with a source of dirty water to be monitored and treated. A first conduit extends from the dirty water inlet interiorly of the enclosure and directs the water pumped therethrough over a first probe that measures the pH level of the water and over a second probe that measures the turbidity of the water. The probes communicate the measured pH and turbidity levels to a controller unit that compares the measured levels to predetermined acceptable levels. If one or both of the measured levels fails to meet the predetermined acceptable levels, the controller causes a first valve to open, communicating the interior conduit with a first dirty water outlet through which the water can be directed from the enclosure back to its source or other location for further settling out of the suspended solids and/or treatment. If both measured levels meet the acceptable levels, the controller opens a second valve, in lieu of the first valve, communicating the conduit with a second water outlet, also located on the enclosure, from which water is directed from the enclosure to and through an external filter, typically a sand media filter, and back into the enclosed system through a return water inlet.

The filtered water passing through the return water inlet is directed via a second interior conduit over another pair of probes that also measure the pH and turbidity levels of the filtered water and communicate those levels to a second controller. The second controller compares the measured pH and turbidity levels to a pair of predetermined acceptable standards. The second controller functions similarly to the first controller and effects the opening of a third valve communicating the second interior conduit with a filtered water outlet on the enclosure in the event one or both of the measured parameters of the filtered water fail to meet the predetermined standards. The filtered water outlet can direct the water therein from the enclosure back to the pond, reservoir or other water source for the further settling out of the suspended solids therein prior to reentry to the enclosed monitoring and treatment system, back to the return water inlet for reprocessing or to an alternate exterior location for settling, filtering and/or treatment. If the pH and turbidity levels in the filtered water meet the predetermined standards, the second controller opens a fourth valve, in lieu of the third valve, communicating the water therein to a clean water outlet for on or off-site discharge.

To expedite the filtering of the suspended solids by the filter, a reservoir containing a supply of flocculent and an operatively connected pump are provided within the protective enclosure for injecting a flocculent into the water within the first interior conduit. The flocculent coalesces the small particles suspended in the water flowing through the conduit, enabling the sand media filter to trap the larger coalesced particles, significantly increasing the efficiency of the filter in reducing the turbidity of the water flowing through the system. While the pH of the water flowing through the system is continuously monitored by the first and third probes, pH control is often conducted at the water source or at another location outside the enclosure. pH monitoring within the enclosed system provides the information for pH control and enables the system operator to effectively utilize the injection of the flocculent which is more effective within a limited pH range. A fluid flow monitoring device is provided in the first interior conduit for measuring the volumetric flow therethrough to enable the operator to determine the amount of flocculent to be injected. A bulkhead fitting is preferably provided on the protective enclosure that is in fluid communication with a second interior pump for use in selectively directing flocculent in the reservoir to one or more alternate exterior locations, such as the dirty water inlet on the enclosure or one or more exterior weir tanks to effect pre-treating of the fluid flow prior to directing the flow through the first interior conduit or additional treating of the fluid flow after passing through one or both of the interior conduits.

In many applications of the present invention, particularly those involving turbid water including larger particle sizes, one or more weir tanks or other filtering elements are employed in the system for effecting the settling of suspended solids from the water prior to and/or after the water is pumped through the first interior conduit. Reducing the turbidity of the water prior to directing the water through the filter reduces filter plugging and the frequency of having to clean the filters by back washing.

The portable water quality monitoring and treatment system of the present invention can also be employed in the treatment of other fluid parameters such as the pH level of the water, the oxidation-reduction potential level and dissolved oxygen levels. In such cases, the water may be of sufficient clarity for off-site disposal but is outside another desired parameter. In such applications, the reservoir and associated pump or pumps would be employed to inject a suitable corrective additive such as acid or caustic material to lower or raise the pH of the water passing through the system in response to the information communicated to the controllers by the first and third probes.

It is the principal object of the present invention to provide a portable and inexpensive on-site system for real time monitoring and treating the turbidity of storm run-off water collected from construction sites and other industrial locations such as refineries and chemical plants.

This and other objects and advantages of the present invention will become readily apparent from the detailed description taken in conjunction with the accompanying drawings.

BRIEF DESCRIPTION OF THE DRAWINGS

FIGS. 8A-8F are schematic representations of an alternate embodiment of the present invention in which

DETAILED DESCRIPTION OF THE PREFERRED EMBODIMENT

Referring now in detail to the drawings, the portable water monitoring and treatment system 10 of the present invention is preferably at least partially housed within a weatherproof protective enclosure 12 and transported to a construction or other site adjacent a contained supply of water to be monitored and treated. The protective enclosure is preferably of a sturdy construction with large end opening doors 11' and a personnel door 11", all securable. The system 10 is placed in fluid communication with the water supply (not shown) via an external fluid flow line 14 that communicates the source of dirty (turbid) water with the system 10 through a dirty water inlet 16 disposed adjacent an exterior side 12' of the protective enclosure.

Figure 1:
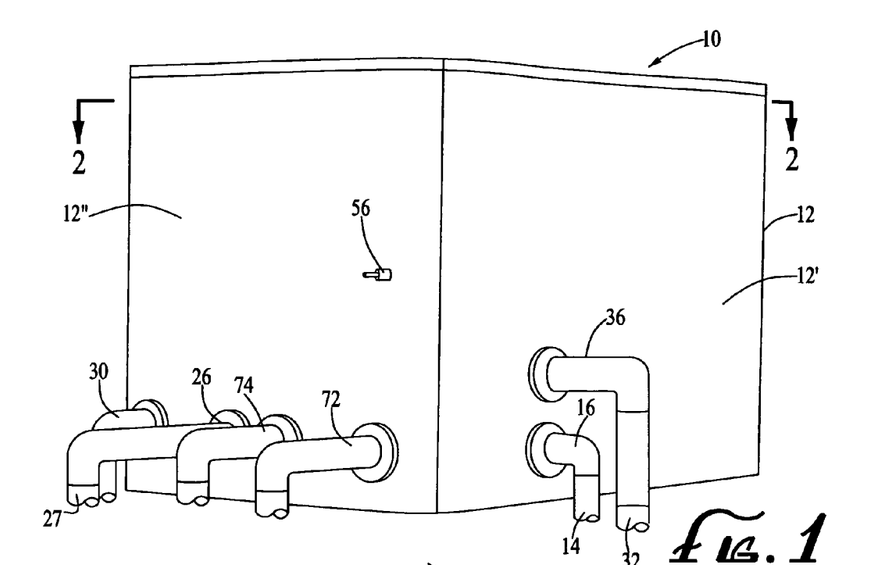
FIG. 1 is a perspective view of the exterior of the water monitoring and treatment system of the present invention.
Figure 2:
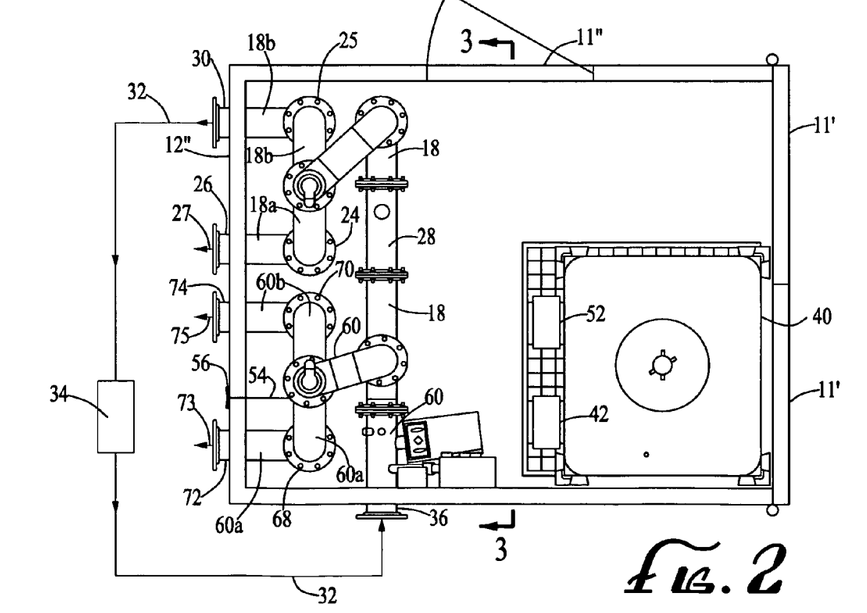
FIG. 2 is a sectional view taken along line 2-2 of FIG. 1 so as to provide an unobstructed top plan view of the components of the system of the present invention.
Figure 3:
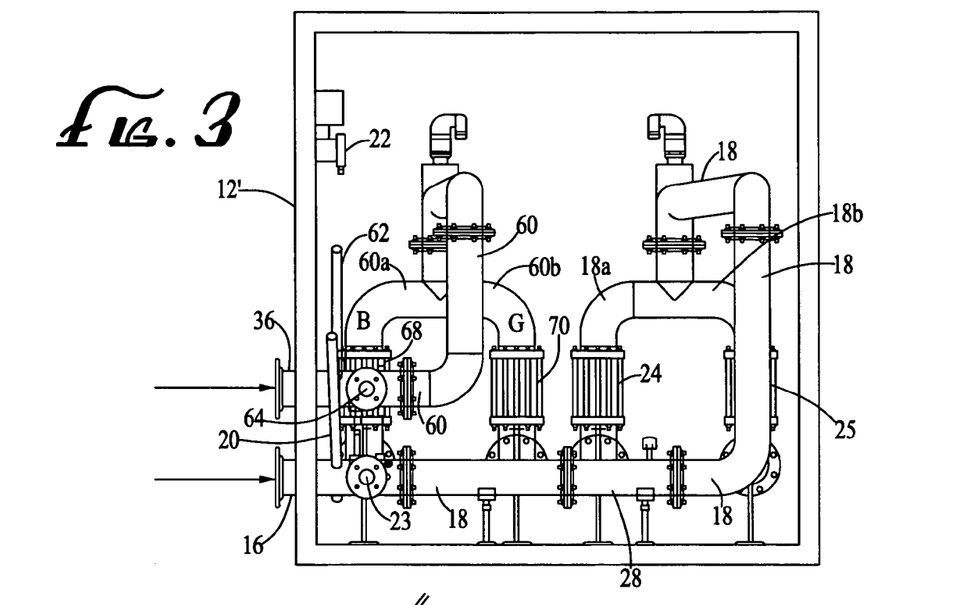
FIG. 3 is a sectional view taken along line 3-3 of FIG. 2 so as to provide an unobstructed side view of the components of the system of the present invention.
Figure 4:
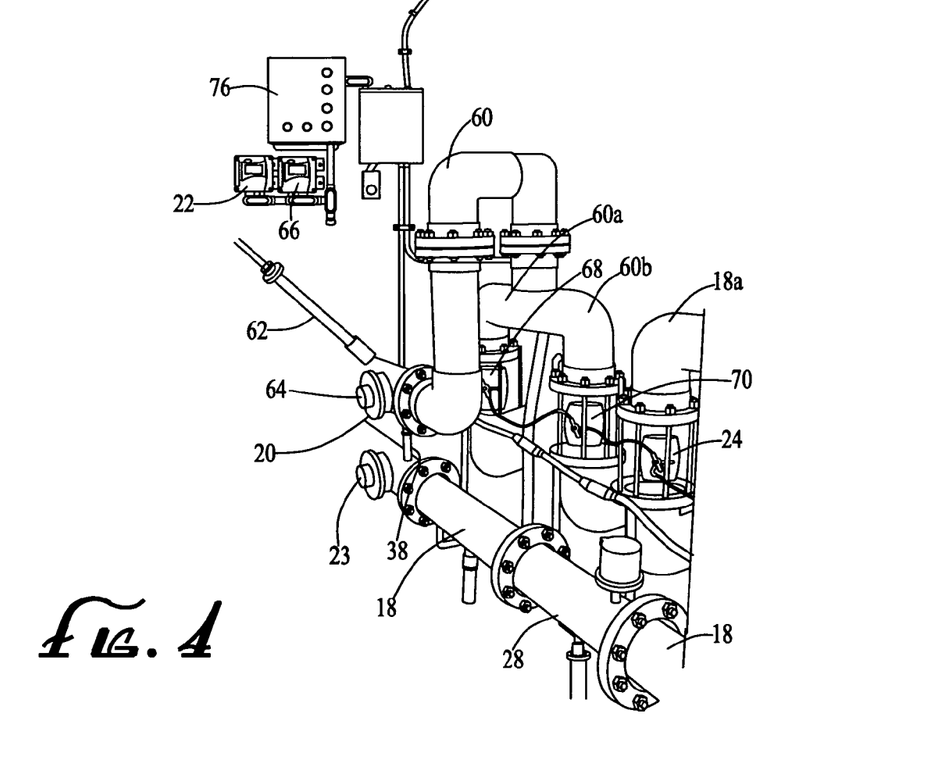
FIG. 4 is a perspective view of a portion of the fluid flow conduits of the present invention.

The water is pumped by means of a pump (not shown) typically located proximate the water supply to and through the dirty water inlet 16 into a first conduit 18 disposed within the protective enclosure 12 (see, e.g., FIG. 3). Conduit 18 is generally sized to accommodate flow rates from about 200 gallons per minute (gpm) up to about 750 gpm, pressures of about 20-80 psi and flow velocities of up to about 8.5 ft/sec. Higher velocity flow will increase the chance of water hammer and reduce the settling of the suspended solids from the water flowing through the system. Conduit 18 extending from inlet 16 directs the water flowing therethrough over a first probe 20 that measures the pH level of the water and communicates that information to a first controller 22 via electrical cable (not shown). After passing probe 20, the water in conduit 18 is directed over a second probe 23 that measures the turbidity of the water and transmits the turbidity level to the same controller 22 via another electrical cable (not shown).

Controller 22 compares the pH and turbidity levels of the incoming water measured by probes 20 and 23 to predetermined acceptable level pH and turbidity levels previously programmed into the controller 22. The typical acceptable pH level for the water flowing through the first conduit 18 is within the range of about 6.5-8.5 and the preferred acceptable turbidity level for the water flowing through conduit 18 is less than 600 NTU. If one or both of the measured parameters fails to meet the predetermined acceptable pH and turbidity levels, the controller 22 opens a first valve 24 and closes a second valve 25, communicating internal conduit 18, via bifurcated conduit section 18a, with a first dirty water outlet 26 on the side 12" of enclosure 12. In the embodiment of the invention illustrated in FIGS. 1-6, the water and suspended solids passing through outlet 26 are then directed back to the source via a fluid flow conduit 27. In alternate embodiments, the out of compliance fluid can be directed to a weir tank or other storage or filtering unit for additional removal of the suspended solids and/or treatment or it can be directed back to the dirty water inlet 16 on enclosure 12. For reasons to be explained, a flow meter 28 is disposed in conduit 18 upstream of valves 24 and 25 for monitoring the volumetric fluid flow therethrough. If both the measured pH and turbidity levels meet the predetermined acceptable levels, the controller 22 opens the second valve 25 and closes valve 24. The water within the internal conduit 18 is then directed via conduit section 18b to a second dirty water outlet 30, also preferably located on enclosure side 12". Water passing through outlet 30 is directed via an external conduit 32 to and through a filter 34, typically a sand media filter, and back to a return water inlet 36.

The sand media filter 34 is of a conventional type, generally comprised of 1-4 pods of layered sand and rock. As the water flows through the serially connected pods and through the sand and rock, the dirt and other suspended solids therein are trapped and removed from the flowing water. As the suspended solids in the water flowing through the conduit are generally quite small, a flocculent such as that marketed by Natural Site Solutions of Redmond, Wash. under the trademark Storm-Klear Gel-Floc, is injected into the water flow at 38 to coalesce the suspended particles into larger particles that can be effectively trapped by the sand media filter 34 and removed from the water flowing through the system 10. Conduit 32 preferably extends at least 80 feet from the water outlet 30 to the sand media filter 34 to facilitate reaction of the flocculent.

Figure 5:
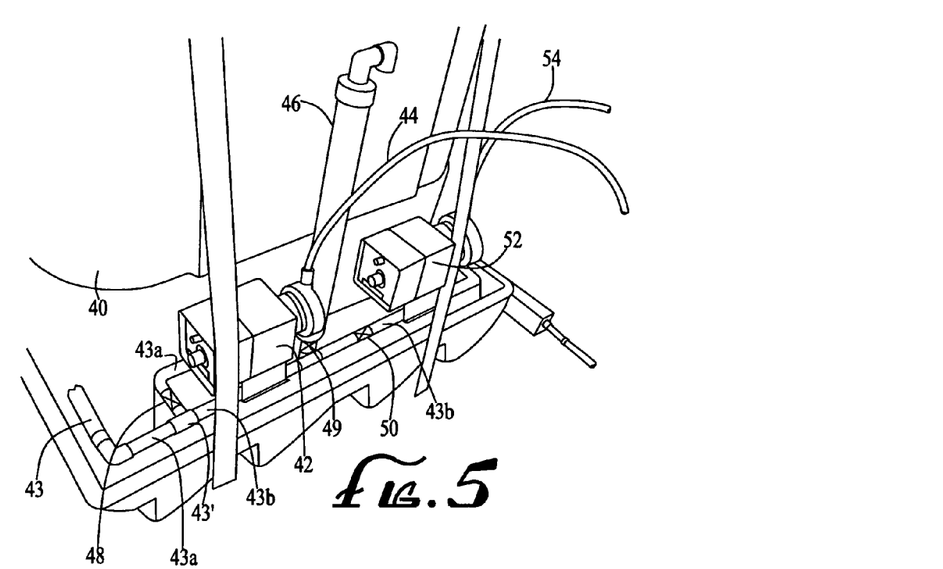
FIG. 5 is an enlarged perspective view of the additive reservoir and associated injection pumps, calibration apparatus and fluid flow lines of the present invention.
Figure 6:
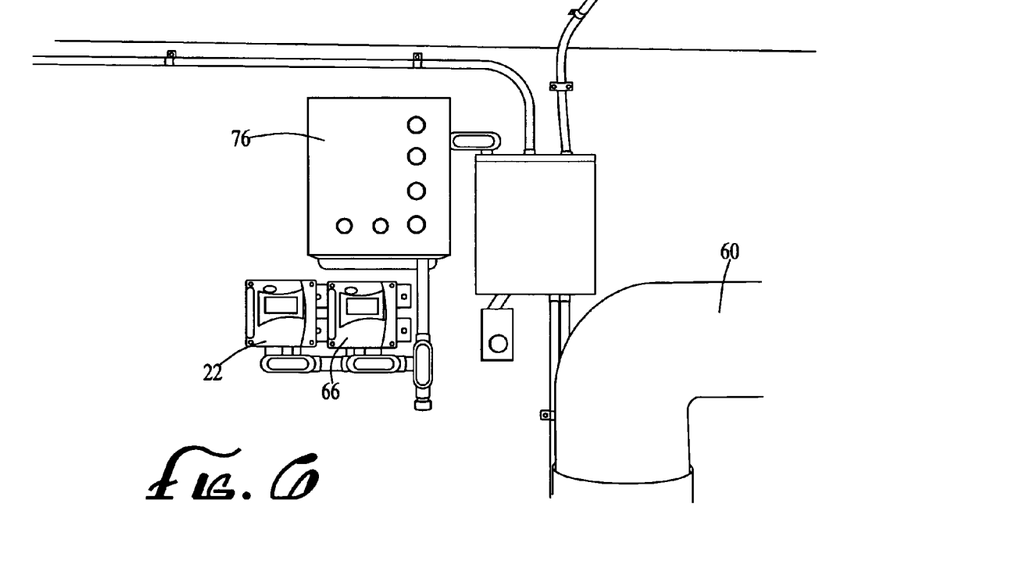
FIG. 6 is an enlarged front plan view of the controllers, alarms, thermostat and main disconnect employed in the system of the present invention.

To inject the flocculent into the water flowing through conduit 18, a containment tank or reservoir 40 and an adjustable injection pump 42 are provided within enclosure 12. The tank 40 has a capacity of about 275-400 gallons to hold a large supply of flocculent to be delivered to the injection site 38 in conduit 18 by pump 42 via conduits 43 and 44. A calibration cylinder 46 is provided for measuring the amount of flocculent being injected and using pump 42, to adjust that amount. As seen in FIG. 5, conduit 43 extends from the lower end of tank 40 and communicates with pump 42 via T-section 43' and conduit section 43a. Conduit section 43a communicates with conduit 44 through pump 42. Conduit section 43b extends from T-section 43' to a second adjustable injection pump 52. Calibration cylinder 46 communicates with conduit section 43b. A tank outlet valve (not shown), is provided in line 43 adjacent to or proximate the lower end of tank 40 to selectively isolate tank 40 from conduit 43. Manually actuated isolation valves 48, 49 and 50 are provided in conduits 43, 43a and 43b. In use, the flocculent is drawn by pump 42 from tank 40 to and through conduit 43, T-section 43', conduit section 43a, pump 42 and conduit 44 to injection point 38. Isolation valve 48 is open and valve 49 is closed. Isolation valve 50 can be open or closed. Opening valve 49 and closing valve 50 will cause flocculent to flow from tank 40 into cylinder 46 to a desired elevation within the cylinder. Immediately closing valve 49 will maintain the desired measured amount of flocculent with the calibration cylinder. Upon closing the tank outlet valve (not shown and opening isolation valve 49, the pump 42 will draw the flocculent within cylinder 46 downwardly and back through conduit section 43b, T-section 43' and conduit section 43a and into and out of conduit 44. By monitoring the period of time within which a measured amount of flocculent is drawn from the calibration 46 and the fluid flow rate through the system using flow meter 28, the volumetric flow rate of the flocculent from tank 40 into conduit 18 can be determined. By adjusting the pump 42, a desired volumetric flow rate is readily determined. Preferably, conventional straightening vanes (not shown) are provided proximate the upstream end of flow meter 28 to reduce the turbulence in conduit 18 and provide a more accurate reading of the volumetric flow therethrough.

A second injection pump 52 is provided in enclosure 12 for directing the flocculent from tank 40 via conduit 54 to a bulkhead 56 on side wall 12" of the enclosure. Pump 52, conduits 43b and 54 and bulkhead 56 enable flocculent to be pumped from tank 40 exteriorly of the enclosure 12 and either back into the dirty water inlet for pre-treating of the dirty water or to one or more weir tanks for either pre and/or post treatment applications involving excessively turbid water (see, e.g., FIG. 7). As can be seen in FIG. 5, by closing isolation valve 48 and opening valves 49 and 50 pump 52 will draw flocculent from tank 40 through conduit 43, T-section 43' and conduit section 43b, pump 52 and into conduit 54 which communicates with the bulkhead 56. By manipulation of the tank valve (not shown) and isolation valves, 48, 49 and 50 in a similar manner to that described above, the amount of flocculent flowing through conduit 54 can be measured, using cylinder 46 and adjusted by pump 52.

Upon entering the return water inlet 36 on the enclosure, the filtered water is directed via a second internal conduit 60 through third and fourth probes 62 and 64. Conduit 60 preferably is sized and configured the same as the first internal conduit 18 to maintain a fluid flow velocity of no greater than 8.5 feet per second. Third probe 62 comprises a second pH measuring device identical to probe 20 and the fourth probe 64 comprises a second turbidity measuring device identical to probe 23. Probes 62 and 64 each communicate the measured pH and turbidity levels respectively with a second controller 66 (shown adjacent controller 22 in FIG. 4) via electrical cables (not shown). The second controller 66 is identical to controller 22 and selectively opens third valve 68 or fourth valve 70 depending on whether or not both the measured levels of pH and turbidity in the filtered water meet the predetermined valves stored in the controller 66. Depending on the parameters of the water being monitored and treated the predetermined acceptable standards are equal to or more stringent than the predetermined acceptable levels for the water passing through the first conduit. The preferred acceptable standard for pH in the second conduit, which is programmed into controller 66, is within the range of 6.5-8.5 which is the same as the acceptable pH level in conduit 18. The preferred acceptable standard for turbidity in conduit 60 is 100 NTU or less, which is more stringent than the acceptable level in the water flowing through the first conduit 18.

If either the pH or the turbidity level in the filtered water within the second internal conduit 60 fails to meet the predetermined standards, controller 66 effects the opening of valve 68 and closing of valve 70, communicating conduit 60, via conduit section 60a, with a first filtered water outlet 72 on enclosure wall 12". From outlet 72, the water can be directed via conduit 73 back to the pond, reservoir or other water source for the further settling out of the suspended solids therein and/or treatment, and then back to the return water inlet 30 for reprocessing or to an alternate location for further treatment prior to reentry into the enclosed portion of the monitoring and treatment system 10. If, however, the measured pH and turbidity levels in the filtered water both meet the predetermined standards programmed into controller 66, the controller opens the fourth valve 70 and closes valve 68, communicating the water passing therethrough to a clean water outlet 74 on enclosure wall 12" from where the treated water can be directed by a suitable conduit to an on or off-site location via conduit 75.

As described above, the pH and turbidity monitoring configuration of the present invention is designed to monitor and log both parameters on the influent and effluent sides. The monitoring and logging of data are real-time via the probes 20, 23, 62 and 64 and controllers 22 and 66. In addition, visual and audio alarms preferably are provided to indicate an out of compliance condition. In the preferred embodiment of the invention, a system status panel 76 is provided within the enclosure 12 comprised of an on-off switch, a test button and four lights (see FIGS. 4 and 6) that indicate whether all systems are in compliance or whether one of the two monitored parameters (e.g. pH and turbidity) in either the influent or effluent is out of compliance. To provide such information, two lights may be dedicated to each controller 22 or 66 and in each pair of lights, one light is dedicated to one of the two probes operatively connected to that controller. If one or more of the lights are out, the fluid parameter associated with that light is out of compliance. In addition, an audio and/or visual alarm can be provided on the exterior of the enclosure to indicate an out of compliance condition.

By way of example, the controllers 22 and 66 employed in the preferred embodiment of the water monitoring and treatment system 10 are both universal controllers marketed by Hach Company of Loveland, Colo. under the model designation LXV401.52.00002. These controllers provide the system with data logging capability in that they are provided with a memory that can be set to retain the reading obtained from the probes at desired intervals to provide a record of the readings that can be accessed by a PDA device. While one controller is employed in the above described system for each pair of probes and valves in each of conduits 18 and 60, a single controller could be employed for communicating with all of the probes and the fluid flow control valves 24, 25, 68 and 70. Accordingly, the term controller assembly is used in many of the claims to describe and include both a single controller communicating with all of the probes and valves and a plurality of individual controllers such as the pair of controllers described and discussed above. Similarly, each pair of valves in a given conduit (e.g. valves 24 and 25) might be replaced with a single diverter or directional control valve. Accordingly, the term control valve assembly is used in many of the claims to describe and include both a single diverter or directional control valve for a given conduit and a pair of individual control valves as described and discussed above.

The probes which measure the pH and turbidity levels in the water flowing through conduits 18 and 60 and transmit that information to controllers 22 and 66 are preferably of a type that enable the sensors themselves to be withdrawn, cleaned and replaced without having to shut down the system. Hach PHD SC Digital Differential pH Sensors, Model DPD2P1 and Hach Insertion Mounting Kits, Model 61368-00 have been successfully employed for the measuring of the pH level in system 10 and transmitting of that information to one of the controllers. Hach Solitax SC Turbidity and Suspended Solids Sensors, Models LXV424.99.00100 and Hach Insertion Mounting Kits, Model 57384-00 have been successfully employed for measuring the turbidity level in the water flowing through conduits 18 and 60 and transmitting those measurements to their respective controllers 22 and 66. The valves 24, 25, 68 and 70 activated by controllers 22 and 66 in the system 10 are solenoid operated Nelson Series 800 control valves marketed by Nelson Irrigation Corporation of Walla Walla, Wash. under the model designation A6B5C2D1E41H2. The injection pumps 42 and 52 for pumping the flocculent from tank 40 to site 38 or bulkhead 56 are LMI Chemical Metering Pumps, Model C771-25HD marketed by Liquid Metronics Inc. of Acton, Mass.

It is to be understood that the particular components of system 10 identified above are examples only and other components could be employed. In addition, the flocculent containment tank 40 could be used to inject other additives to site 38 and bulkhead 56. For example, a suitable acid, soda ash or other pH altering substance could be injected by pump 42 from tank 40 into conduit 18 in lieu of a flocculent for applications in which the water to be treated is of acceptable clarity but is outside a desired pH range. As noted above, the tank and associated pumps, valves and lines could also be used with different probes to introduce and monitor other chemicals into the fluid passing through system 10.

Figure 7:
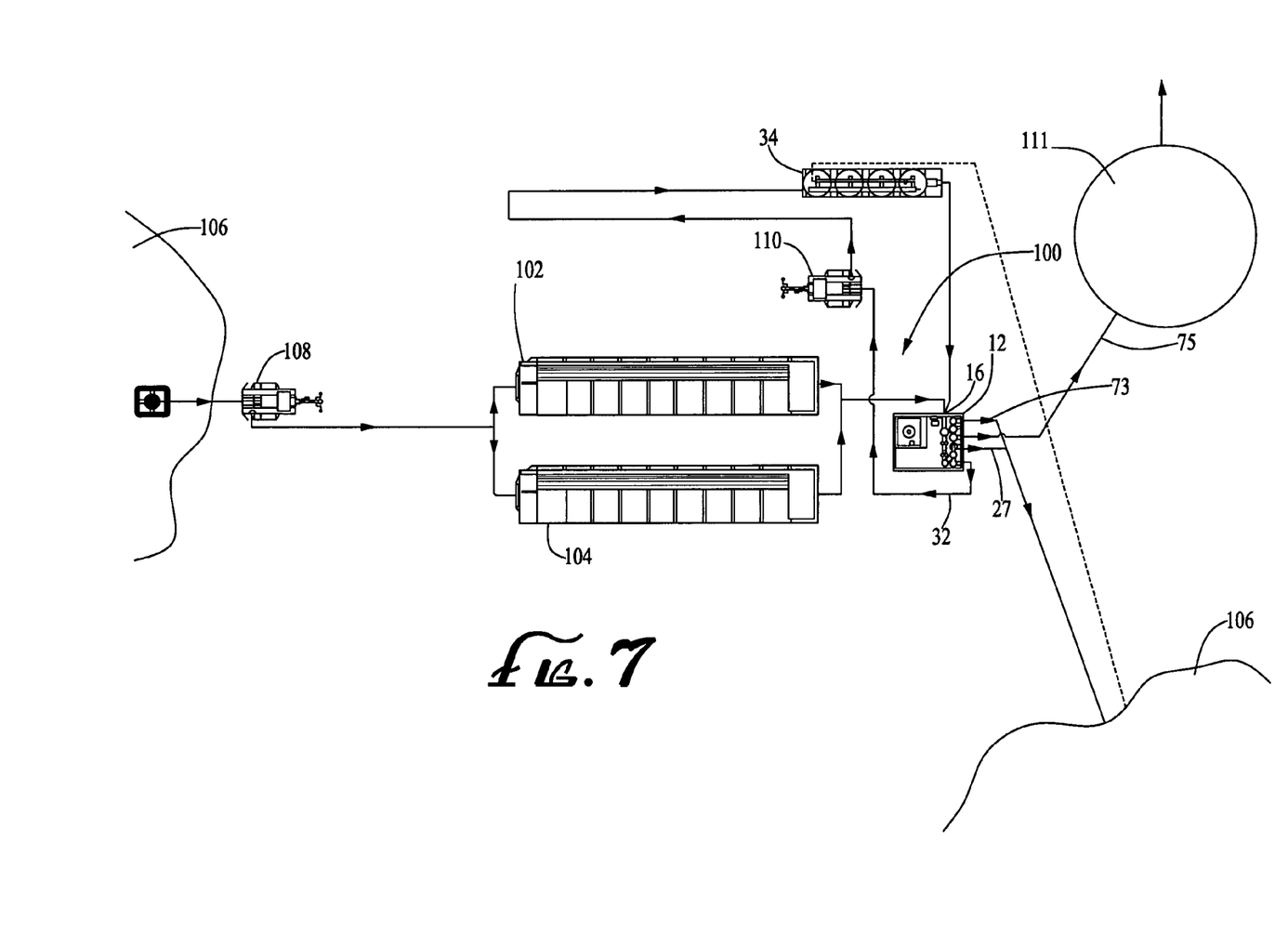
FIG. 7 is a schematic view of a modified form of the present invention in a field application.

FIG. 7 illustrates a modified embodiment of the present invention particularly adapted for use in monitoring and treatment of turbid water including larger particle sizes. The system 100 illustrated in FIG. 7 incorporates the enclosed portion of system 10 and additionally includes a pair of external weir tanks 102 and 104. Additionally, FIG. 7 illustrates a representative source 106 of dirty water, not illustrated in FIGS. 1-6, as well as a pair of external pumps 108 and 110 for directing the water flow to and through system 100 and ultimately to the clean water collection area 111 from where the water can be directed to an on or off site location.

In the embodiment of the invention illustrated in FIG. 7, dirty water is pumped from source 106 by means of pump 108 and a floating suction device 109 either directly to the dirty water inlet 16 in enclosure 12, as in the prior embodiment, or through one or both weir tanks 102 and 104 prior to entering conduit 18 through inlet 16. Suitable valving (not shown) is provided to enable the operator to direct the water either directly to inlet 16 or through one or both of the weir tanks prior to entering inlet 16. In the weir tanks, the water flow is passed over and about a series of baffles to effect the settling out of the suspended solids in the water flowing through the system. As in the prior embodiment, the injection pump 52 in enclosure 12 can be employed to eject flocculent into the water flow passing through one or both weir tanks either prior to or after passing through the interior conduit 18. It is to be understood that FIG. 7 illustrates just one alternative embodiment of the portable water monitoring and treatment system of the present invention. Numerous different external settling and filtering apparatus and associated piping and pumps could be employed with the internal portion of the system housed within enclosure 12. It is also to be understood that the system could be employed without the use of a weatherproof housing, but that such a housing is preferred for the protection of the instrumentation employed therein.

Figure 8A:
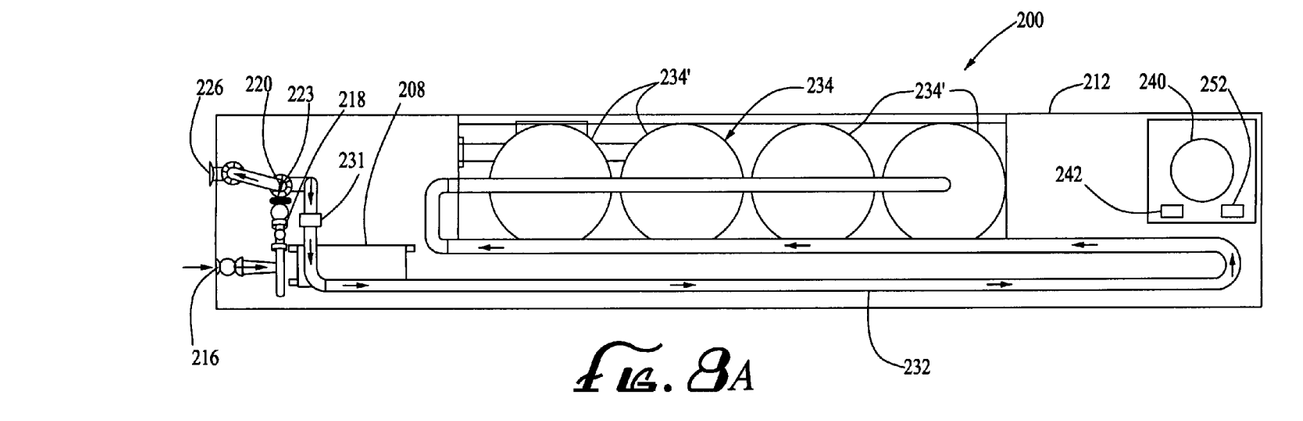
FIG. 8A is a top plan view of the enclosed system with the top of the enclosure removed to illustrate the fluid flow path to the sand media filter.
Figure 8B:
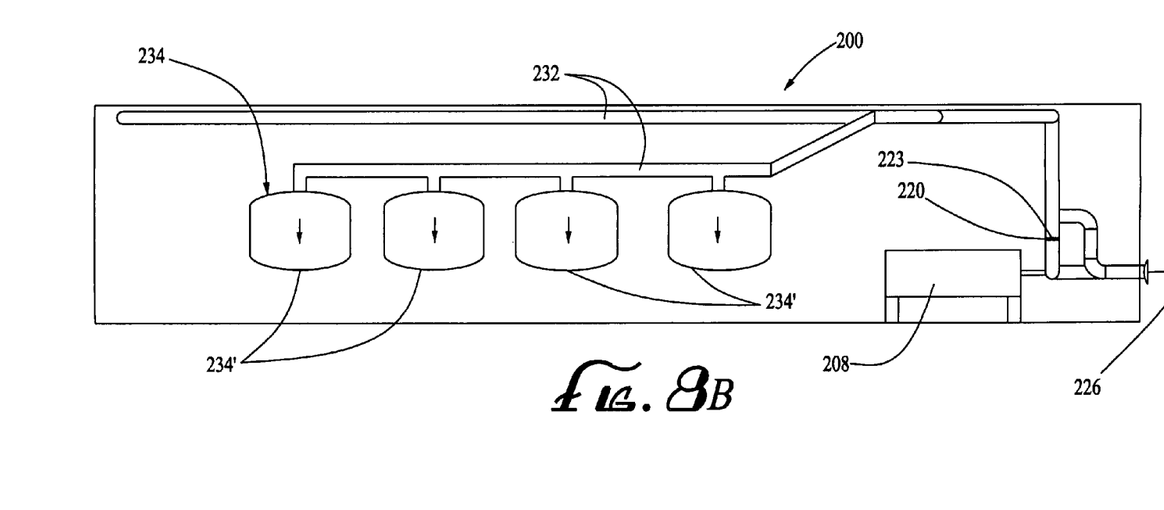
FIG. 8B is a side view thereof and FIG. 8C is an end view thereof.
Figure 8C:
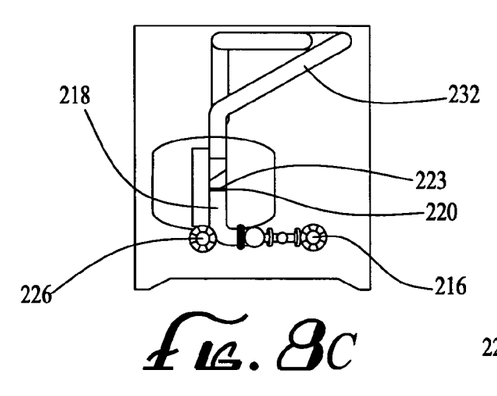
Figure 8D:
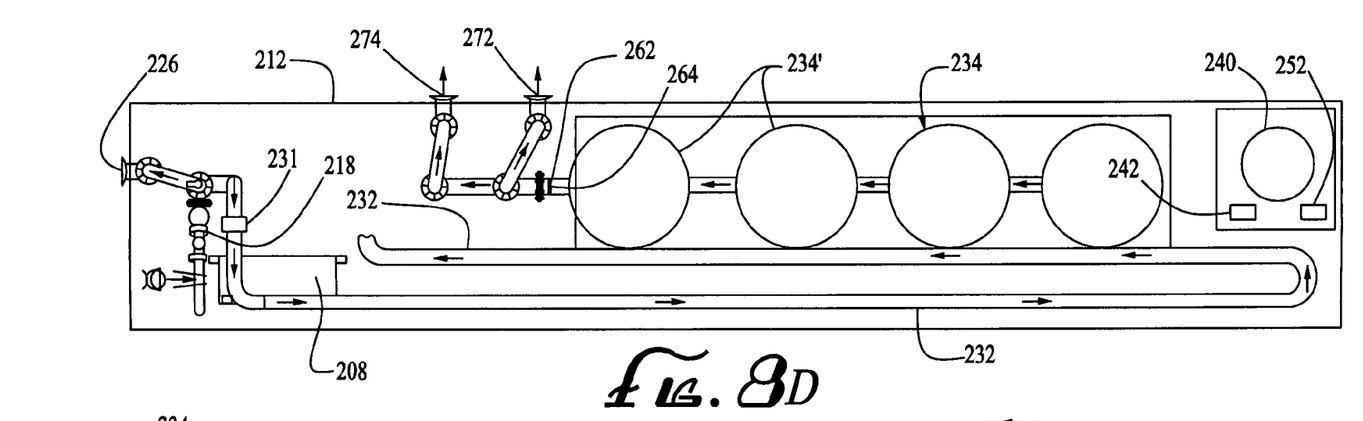
FIG. 8D is another top plan view of the system with the top of the enclosure removed to illustrate the fluid flow through and from the sand media filter to discharge.
Figure 8E:
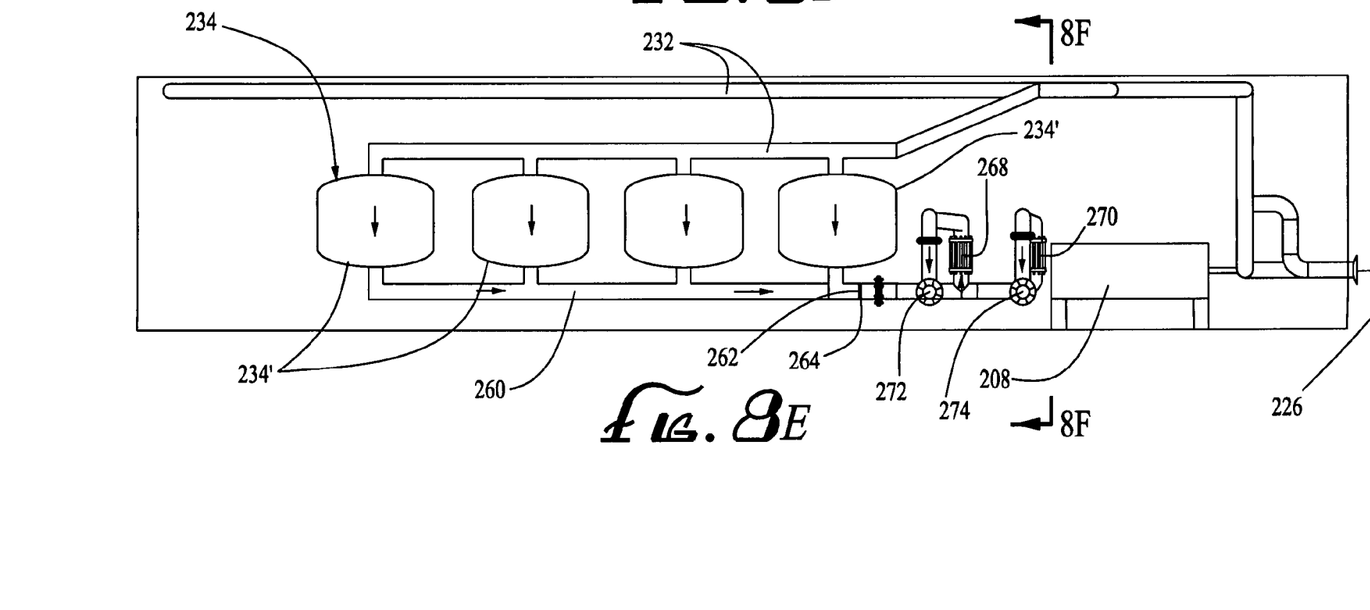
FIG. 8E is a side view of the system illustrating the fluid flow through and from the sand media filter to discharge and FIG. 8F is a sectional end view taken along the line 8F-8F in FIG. 8E.
Figure 8F:
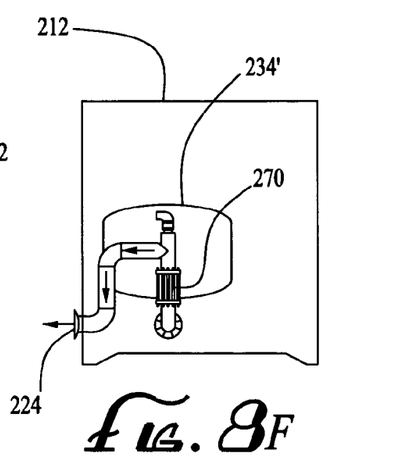

In an alternate embodiment of the invention, with the exception of the fluid flow lines leading to and from the protective enclosure 212, the entire fluid monitoring and treatment system is disposed within the protective enclosure 212 which is approximately forty-five feet in length. Such a system is illustrated in FIGS. 8A-8F. For clarity and due to the similarity of the contained system 200 with the system 10 of the first embodiment, not all of the components of the system are included in the individual drawings. FIGS. 8A-8C illustrate only the fluid flow through the system 200 to the sand media filter 234. FIGS. 8D-8E illustrate the flow through and from the sand media filter to discharge. In addition, certain elements common to both systems 10 and 200 (e.g. controllers, probes, flocculent feed lines, etc.) are either omitted from FIGS. 8A-8F or are identified by location only.

In the fully contained system 200, water is drawn into the first conduit 218 through a dirty water inlet 216 by an internally positioned pump 208 and is monitored by pH and turbidity probes at 220 and 223. If the water fails to meet the predetermined acceptable levels of pH and turbidity programmed into a controller (not shown), that water, as in the first embodiment, is directed via the controller and an associated valve through a water outlet 226 and back to the water source via an external fluid flow conduit. If the water flowing through conduit 218 meets the predetermined desired pH and turbidity levels, the controller 222 closes the aforesaid valve and opens a second valve and the water is directed to conduit 232. The controller and valves are of the same type and function in the same way as controller 22 and valves 24 and 25 in system 10 of the prior embodiment.

Conduit 232 serves the same function as conduit 32 in system 10, but is entirely disposed within the larger enclosure 212. Conduit 232 preferably is routed upwardly and back and forth about the ceiling of the enclosure 212 as seen in FIGS. 8A and 8B, so as not to obstruct the interior of the enclosure or block access to the components of the system within the enclosure. Conduit 232 directs the water flowing therethrough to and downwardly through a sand media filter 234 as seen in FIG. 8E and into a second conduit 260 that corresponds to the internal conduit 60 of the prior embodiment. As in the prior embodiment, conduit 232 preferably defines a length of 80 feet prior to reaching filter 234. Thus, the protective enclosure 212 in system 200 is necessarily substantially larger than the enclosure 12 of the prior embodiment. In the embodiment of system 200 illustrated in the drawings the sand media filter is comprised of four connected pods 234'. The filtered water flowing through conduit 260 is then monitored by a second pair of pH and turbidity probes at 262 and 264 that are associated with a second controller (not shown). Again, this second controller and associated probes 262 and 264 are preferably identical to and function the same as controller 66 and probes 62 and 64 in system 10.

If the water flowing through conduit 260 is determined by the operative controller to meet both the predetermined turbidity and pH standards programmed into the controller, a control valve 268 is closed and valve 270 is opened, communicating the conduit 260 with a clean water outlet 274 from which the water can be directed via a suitable conduit to an on or off-site location. If either of the measured turbidity or pH levels fails to meet the predetermined standard, the controller opens valve 268 and closes valve 270, communicating conduit 260 with a third water outlet 272 from which the water is again directed back to the source. A reservoir 240 containing a supply of a water treatment material (e.g. flocculent) and associated injection pumps 242 and 252, flow meter 228, a calibration cylinder (not shown) and associated valves and lines (not shown) are also provided in the enclosure 212 for the treatment of the water flowing therethrough as in the prior embodiments. In addition, a static mixer 231 is provided in line 232 (see FIGS. 8A and 8D) to enhance the mixing of the flocculent in the water. Thus, system 200 provides a totally enclosed monitoring and treatment system. Indeed, even the pump 208 by which the water is pulled from its source to the water inlet 216 on the enclosure 212 is preferably located within the enclosure 212.

Figure 9:
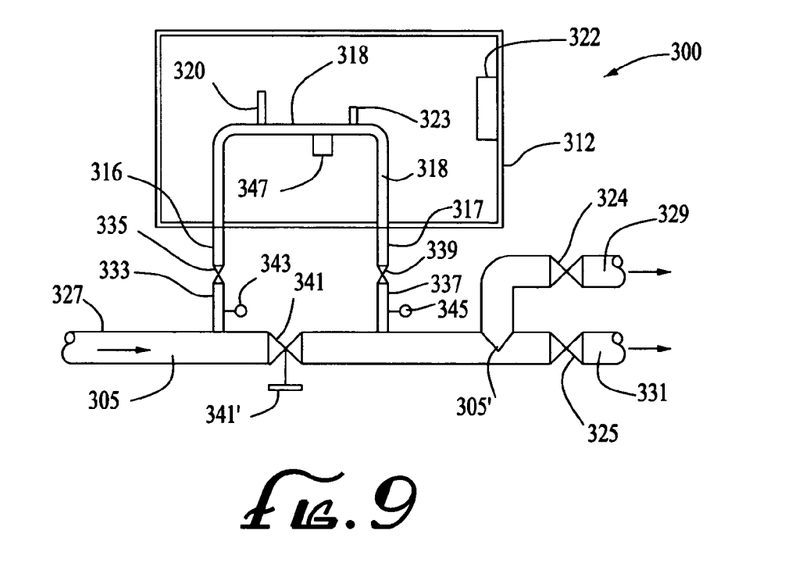
FIG. 9 is a schematic representation of yet another embodiment of the present invention.

Yet another embodiment of the present invention is illustrated in FIG. 9. The system 300 illustrated therein is employed solely for the on-site monitoring of the water. As such, there is no need for the second internal conduit of the prior embodiments, nor the associated valves and controller; nor is there any need for a reservoir and associated pumps for injecting a water treatment material into the conduit. Accordingly, system 300 can be provided in a much smaller enclosure 312 that is in the nature of a protective box.

System 300 comprises a water inlet 316 and a water outlet 317 mounted in the side of the protective enclosure 312 and an internal conduit 318 disposed within the enclosure that extends between inlet 316 and outlet 317. A pair of probes 320 and 323 are disposed within conduit 318 for measuring selected parameters of the water flowing therethrough (e.g. pH and turbidity). Exteriorly of the enclosure is a main flow line 305 defining a main water inlet 327 and a pair of main water outlets 329 and 331. As seen in FIG. 9, the main flow line 305 is bifurcated at 305' to define the two main water outlets. Valves 324 and 325 are provided in the main conduit 305 proximate water outlets 329 and 331. Again, a single diverter or direction control valve might be employed in lieu of valves 324 and 325.

Main line 305 communicates with the water inlet 316 on enclosure 312 via connector line 333 and ball valve 335 and with the water outlet 317 via connector line 337 and ball valve 339. A manually actuated restrictor valve 341 is provided in main line 305 between connector lines 333 and 337 for creating a pressure differential between the upstream and downstream sides of valve 341 to effect water flow through connector line 333, internal conduit 318 and connector line 337 as water continues to flow through the main line 305. Ball valves 335 and 339 are provided in lines 333 and 337 respectively so as to seal off the internal conduit 318. Pressure gauges 343 and 345 can be provided in lines 333 and 337 as illustrated in FIG. 9.

In use, water is pumped from a source through the water inlet 327 in the main line 305, through the line and out water outlet 329. By rotating the wheel 341' on restrictor valve 341, the valve partially occludes the line, restricting the water flow therethrough creating a pressure drop across the valve and causing water to flow through the connector lines 333 and 337 and the internal conduit 318 (ball vales 335 and 339 being open). The volume of flow through internal conduit 318 can be regulated by means of valve wheel 341'.

The selected parameters (e.g. pH and turbidity) of the water flowing through the internal conduit 318 are monitored by probes 320 and 323 and transmitted to a controller 322 within the enclosure 312. If both measured parameters are within the predetermined parameter levels previously programmed into controller 322, the controller opens valve 325 and closes valve 324 thereby communicating the water inlet 316 from the main line with main line outlet 331 so as to direct the water to an on or off-site location for collection and/or disposal. If either of the measured parameters fail to meet the predetermine levels, the controller 322 will open valve 324 and close valve 325 directing the water flow through the main line through outlet 329, directing the water flow back to the source. Probes 320 and 323, control valves 324 and 325 and controller 322 are preferably all of the same type and function and cooperate in the same manner as probes 20 and 23, valves 24 and 25 and controller 22 of the first embodiment.

A fluid flow sensor 347 is preferably provided in conduit 318 for sensing the presence of water flowing through conduit 318 and communicating that information either to a controller assembly or a separate controller 323 operatively connected to valves 324 and 325 for opening valve 324 and closing valve 325 in the absence of water flowing through conduit 318. Thus, unless otherwise directed by an operator, when conduit 318 is dry and the monitoring system 300 is not in use, the system may assume a default mode in which the water flowing through the main line will be directed through water outlet 329 and back to the source.

Various other changes and modifications may be made in carrying out the present invention without departing from the spirit and scope thereof. Insofar as such changes and modifications are within the purview of the appended claims, they are to be considered as part of the present invention.

I claim:

1. A portable system for the continuous on-site monitoring and treatment of water comprising:
    a protective enclosure adapted to be positioned proximate a source of collected water, said enclosure containing a first dirty water inlet, a first dirty water outlet, a second dirty water outlet, a return water inlet, a filtered water outlet and a clean water outlet;
    an internal fluid flow system disposed within said enclosure and comprising a first conduit extending from said first dirty water inlet to said first and second dirty water outlets and a second conduit extending from said return water inlet to said filtered water outlet and said clean water outlet;
    a pump mechanism for delivering water from a source to said first dirty water inlet on said enclosure and through said first and second conduits therein;
    a first probe disposed within said first conduit for measuring a first parameter of the water flowing through said first conduit;
    a second probe disposed within said second conduit for measuring said first parameter of the water flowing through said second conduit; and
    a controller assembly disposed within said enclosure and operatively connected to said probes for receiving from said probes the measured parameters of the water flowing through said conduits, said controller assembly comparing the parameter measured by said first probe with a predetermined acceptable level for said parameter and communicating said dirty water inlet with said first dirty water outlet if the parameter measured by said first probe is below said predetermined acceptable level and communicating said dirty water inlet with said second dirty water outlet if the parameter measured by said first probe meets or exceeds said predetermined acceptable level, said controller assembly further comparing the parameter measured by said second probe in said second conduit with a predetermined acceptable standard for said parameter and communicating said return water inlet with said filtered water outlet if the parameter measured by said second probe is below said predetermined acceptable standard and communicating said return water inlet with said clean water outlet if the measured parameter meets or exceeds said predetermined acceptable standard.

2. The portable system of claim 1 including a first control valve assembly in said first conduit selectively communicating said first dirty water inlet with said first dirty water outlet or said second dirty water outlet and a second control valve assembly in said second conduit selectively communicating said return water inlet with said filtered water outlet or said clean water outlet, said control valve assemblies being operatively connected to said controller assembly for actuation by said controller assembly in response to the aforesaid comparison of the measured parameters received from said first and second probes with the predetermined acceptable level and standard.

3. The portable system of claim 2 wherein said controller assembly comprises a first control mechanism operatively connected to said first probe and said control valve assembly in said first conduit and a second control mechanism operatively connected to said second probe and said control valve assembly in said second conduit, said control mechanisms each monitoring and storing the measured parameters received from the probe to which said mechanism is connected whereby a record of the measured parameter in each conduit can be obtained.

4. The portable system of claim 1 wherein said system further comprises a reservoir adapted to contain a supply of water treatment material therein and operatively connected to said first conduit, a second pump mechanism for directing a measured amount of water treatment material from said reservoir into said first conduit and a fluid flow monitoring device in said first conduit for measuring the volumetric fluid flow therethrough whereby the amount of water treatment material to be delivered from said reservoir into said first conduit can be determined.

5. The portable system of claim 1 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

6. The portable system of claim 2 wherein said system further comprises a reservoir adapted to contain a supply of water treatment material therein and operatively connected to said first conduit, a second pump mechanism for directing a measured amount of water treatment material from said reservoir into said first conduit and a fluid flow monitoring device in said first conduit for measuring the volumetric fluid flow therethrough whereby the amount of water treatment material to be delivered from said reservoir into said first conduit can be determined.

7. The portable system of claim 4 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

8. The portable system of claim 4 wherein the parameter measured by said first and second probes is the turbidity level of the water and wherein said water treatment material comprises a flocculent material.

9. The portable system of claim 7 including a bulkhead carried by said enclosure, a conduit communicating said reservoir with said bulkhead and a third pump mechanism for directing a measured amount of water treatment material from said reservoir to said bulkhead whereby said external fluid flow system can be communicated with said bulkhead for the injection of said treatment material through said bulkhead into said external fluid flow system for the treatment of water exteriorly of said enclosure.

10. The portable system of claim 9 wherein the parameter measured by said first and second probes is the turbidity level of the water and wherein said water treatment material comprises a flocculent material.

11. The portable system of claim 10 wherein said filter element in said second external conduit is a sand media filter.

12. The portable system of claim 10 wherein said filter element in said third external conduit comprises a weir tank.

13. The portable system of claim 11 wherein said filter element in said third external conduit comprises a weir tank.

14. The portable system of claim 8 wherein said system additionally includes third and fourth probes for measuring the pH levels in fluids, said third probe being disposed in said first conduit and said fourth probe being disposed in said second conduit, said third and fourth probes being operatively connected to said controller assembly such that said controller assembly receives from said third and fourth probes the measured pH levels of water flowing through said first and second conduits, said controller assembly comparing the pH level measured by said third probe with a predetermined acceptable pH range and communicating said dirty water inlet with said first dirty water outlet if the pH level measured by said third probe is outside said predetermined acceptable range and communicating said dirty water inlet with said second dirty water outlet if the pH level measured by said third probe is within said range and the turbidity level measured by said first probe meets or exceeds said predetermined acceptable level, said controller assembly further comparing the pH level measured by said fourth probe with said predetermined acceptable range and communicating said return water inlet with said filtered water inlet if the pH level measured by the fourth probe is outside said predetermined acceptable range and communicating said return water inlet with said clean water outlet if the measured pH level is within said predetermined acceptable range and the turbidity level measured by said second probe meets or exceeds said predetermined acceptable standard.

15. The portable system of claim 14 wherein the parameter measured by said first and second probes is the turbidity level of the water and wherein said water treatment material comprises a flocculent material.

16. The portable system of claim 14 including a first control valve assembly in said first conduit for selectively communicating with said first dirty water inlet with said first or second dirty water outlets and a second control valve assembly disposed in said second conduit for selectively communicating said return water inlet with said filtered water outlet or said clean water outlet, said control valve assemblies being operatively connected to said controller assembly for actuation by said controller assembly in response to the measured parameters received from said first and second probes.

17. A portable system for the continuous on-site monitoring and treatment of turbid water comprising:
a protective enclosure adapted to be positioned proximate a source of collected water, said enclosure containing a first dirty water inlet, a first dirty water outlet, a second dirty water outlet, a return water inlet, a filtered water outlet and a clean water outlet;
an internal fluid flow system disposed within said enclosure and comprising a first conduit extending from said first dirty water inlet to said first and second dirty water outlets and a second conduit extending from said return water inlet to said filtered water outlet and said clean water outlet;
a pump mechanism for delivering water from a source to said first dirty water inlet on said enclosure and through said first and second conduits therein;
a first probe disposed within said first conduit for measuring the turbidity level of the water flowing through said first conduit;
a second probe disposed within said second conduit for measuring the turbidity level of the water flowing through said second conduit;
a first control valve assembly disposed in said first conduit for selectively communicating said first dirty water inlet with said first dirty water outlet or said second dirty water outlet;
a second control valve assembly disposed in said second conduit for selectively communicating said return water inlet with said filtered water outlet or said clean water outlet; and
a controller assembly disposed within said enclosure and being operatively connected to said probes and said control valve assemblies, said controller assembly receiving from said probes the measured turbidity levels of the water flowing through said conduits and comparing the turbidity level measured by said first probe with a predetermined acceptable turbidity level and actuating said first control valve assembly to communicate said dirty water inlet with said first dirty water outlet if the level measured by said first probe is below said predetermined acceptable level or to communicate said dirty water inlet with said second dirty water outlet if the level measured by said first probe meets or exceeds said predetermined acceptable level, said controller assembly further comparing the turbidity level measured by said second probe in said second conduit with a predetermined acceptable turbidity standard and actuating said second valve assembly to communicate said return water inlet with said filtered water outlet if the level measured by said second probe is below said predetermined acceptable standard or to communicate said return water inlet with said clean water outlet if the measured parameter meets or exceeds said predetermined acceptable standard.

18. The portable system of claim 17 wherein said predetermined acceptable turbidity level is higher than said predetermined turbidity standard.

19. The portable system of claim 17 wherein said system further comprises a reservoir adapted to contain a supply of flocculent material therein, said reservoir being disposed in said enclosure and operatively connected to said first conduit, a second pump mechanism for directing a measured amount of flocculent material from said reservoir into said first conduit and a fluid flow monitoring device in said first conduit for measuring the volumetric fluid flow therethrough whereby the amount of flocculent material to be delivered from said reservoir into said first conduit can be determined.

20. The portable system of claim 19 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

21. The portable system of claim 20 including a bulkhead carried by said enclosure, a conduit communicating said reservoir within said enclosure with said bulkhead and a third pump mechanism for directing a measured amount of flocculent material from said reservoir to said bulkhead whereby said external fluid flow system can be communicated with said bulkhead for the injection of said flocculent material through said bulkhead into said external fluid flow system exteriorly of said enclosure.

22. The portable system of claim 17 wherein said system additionally includes third and fourth probes for measuring the pH levels in fluids, said third probe being disposed in said first conduit and said fourth probe being disposed in said second conduit, said third and fourth probes being operatively connected to said controller assembly such that said controller assembly receives from said third and fourth probes the measured pH levels of water flowing through said first and second conduits, said controller assembly comparing the pH level measured by said third probe with a predetermined acceptable pH range and actuating said first control valve assembly to communicate said dirty water inlet with said first dirty water outlet if the pH level measured by said third probe is outside said predetermined acceptable range or to communicate said dirty water inlet with said second dirty water outlet if the pH level measured by said third probe is within said range and the turbidity level measured by said first probe meets or exceeds said predetermined acceptable level, said controller assembly further comparing the pH level measured by said fourth probe with said predetermined acceptable range and actuating said second control valve assembly to communicate said return water inlet with said filtered water inlet if the pH level measured by the fourth probe is outside said predetermined acceptable range or to communicate said return water inlet with said clean water outlet if the measured pH level is within said predetermined acceptable range and the turbidity level measured by said second probe meets or exceeds said predetermined acceptable standard.

23. The portable system of claim 22 wherein said system further comprises a reservoir adapted to contain a supply of flocculent material therein, said reservoir being disposed in said enclosure and operatively connected to said first conduit, a second pump mechanism for directing a measured amount of flocculent material from said reservoir into said first conduit and a fluid flow monitoring device in said first conduit for measuring the volumetric fluid flow therethrough whereby the amount of flocculent material to be delivered from said reservoir into said first conduit can be determined.

24. The portable system of claim 22 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

25. The portable system of claim 22 wherein said system further comprises a reservoir adapted to contain a supply of flocculent material therein, said reservoir being disposed in said enclosure and operatively connected to said first conduit, a second pump mechanism for directing a measured amount of flocculent material from said reservoir into said first conduit and a fluid flow monitoring device in said first conduit for measuring the volumetric fluid flow therethrough whereby the amount of flocculent material to be delivered from said reservoir into said first conduit can be determined.

26. The portable system of claim 25 including a bulkhead carried by said enclosure, a conduit communicating said reservoir with said bulkhead and a third pump mechanism for directing a measured amount of flocculent material from said reservoir to said bulkhead whereby said external fluid flow system can be communicated with said bulkhead for the injection of said flocculent material through said bulkhead into said external fluid flow system for the treatment of water exteriorly of said enclosure.

27. A portable system for the continuous on-site monitoring and treatment of water comprising:
  a protective enclosure adapted to be positioned proximate a source of collected water, said enclosure containing a first dirty water inlet, a first dirty water outlet, a second dirty water outlet, a return water inlet, a filtered water outlet and a clean water outlet;
  an internal fluid flow system disposed within said enclosure and comprising a first conduit extending from said first dirty water inlet to said first and second dirty water outlets and a second conduit extending from said return water inlet to said filtered water outlet and said clean water outlet;
  a first probe disposed within said first conduit for measuring a first parameter of the water flowing through said first conduit;
  a second probe disposed within said second conduit for measuring said first parameter of the water flowing through said second conduit; and
  a controller assembly disposed within said enclosure and operatively connected to said first and second probes for receiving data from said probes regarding the measured parameters of the water flowing through said first and second conduits, said controller assembly comparing the measured parameters with predetermined acceptable levels for water flowing through said first and second conduits and selectively communicating said first and second conduits with one of said water outlets for selective further treatment and disposal in response to the comparisons of the measured parameters with said predetermined acceptable levels.

28. The portable system of claim 27 including a first control valve assembly in said first conduit selectively communicating said first dirty water inlet with said first dirty water outlet or said second dirty water outlet and a second control valve assembly in said second conduit selectively communicating said return water inlet with said filtered water outlet or said clean water outlet, said control valve assemblies being operatively connected to said controller assembly for actuation by said controller assembly in response to the aforesaid comparison of the measured parameters received from said first and second probes with the predetermined acceptable levels.

29. The portable system of claim 27 wherein said controller assembly comprises a first control mechanism operatively connected to said first probe and said control valve assembly in said first conduit and a second control mechanism operatively connected to said second probe and said control valve assembly in said second conduit, said control mechanisms each monitoring and storing the measured parameters received from the probe to which said mechanism is connected whereby a record of the measured parameter in each conduit can be obtained.

30. The portable system of claim 27 wherein said system further comprises a reservoir adapted to contain a supply of water treatment material therein and operatively connected to said first conduit, a second pump mechanism for directing a measured amount of water treatment material from said reservoir into said first conduit and a fluid flow monitoring device in said first conduit for measuring the volumetric fluid flow therethrough whereby the amount of water treatment material to be delivered from said reservoir into said first conduit can be determined.

31. The portable system of claim 27 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

32. The portable system of claim 28 wherein said system further comprises a reservoir adapted to contain a supply of water treatment material therein and operatively connected to said first conduit, a second pump mechanism for directing a measured amount of water treatment material from said reservoir into said first conduit and a fluid flow monitoring device in said first conduit for measuring the volumetric fluid flow therethrough whereby the amount of water treatment material to be delivered from said reservoir into said first conduit can be determined.

33. The portable system of claim 30 including an external fluid flow system adapted to be operatively connected to said water inlets and outlets on said enclosure, said external system comprising: a first external conduit extending from said first dirty water outlet for the return of the water flowing through said first conduit to the source thereof or an alternate location; a second external conduit communicating said second dirty water outlet with said return water inlet and including at least one filter element disposed in said second external conduit; a third external conduit communicating said filter water outlet to said return water inlet and including at least one filter element disposed in said third external conduit for the further treatment of water passing therethrough and a fourth external conduit extending from said clean water outlet for delivery of water passing therethrough to an off-site location.

34. The portable system of claim 30 wherein the parameter measured by said first and second probes is the turbidity level of the water and wherein said water treatment material comprises a flocculent material.

35. A method for continuous on-site monitoring and treatment of water comprising the following:
 directing water from a collected water source through a first conduit;
 measuring a first parameter of the water flowing through the first conduit;
 comparing the measured parameter with a predetermined approved level for said parameter;
 directing the water flow from said first conduit to a first water outlet in the event the measured parameter fails to meet the predetermined approved level for said parameter;
 directing the water flow from said first conduit to a second water outlet in the event the measured parameter meets the predetermined approved level for said parameter;
 directing the water flow from said first water outlet back to the water source or to an alternate location;
 directing the water flow from said second water outlet to and through a second conduit;
 measuring the first parameter of the water flowing through the second conduit;
 comparing the measured parameter of the water flowing through said second conduit with a predetermined approved standard for said parameter;
 directing the water from said second conduit to a third water outlet in the event the measured parameter in the second conduit fails to meet the predetermined approved standards for said parameter;
 directing the water flow from said second conduit to a fourth water outlet in the event the measured parameter in the water flowing through the second conduit meets the predetermined approved standard for said parameter;
 directing the water flow from the third water outlet for selective further processing; and
 directing the water from said fourth water outlet to an off-site clean water collection or distribution site.

36. The method of claim 35 including the additional steps of measuring the volumetric fluid flow of water through said first conduit and injecting a measured amount of a water treatment material into the water flowing through said first conduit; said measured amount being determined based on the measured volumetric fluid flow of water through said first conduit.

37. The method of claim 36 including the additional step of filtering the water directed from said second water outlet to said second conduit.

38. A method for continuous on-site monitoring and treatment of water comprising the following:
 directing water from a collected water source through a first conduit;
 measuring the turbidity and pH levels of the water flowing through the first conduit;
 comparing the measured levels of turbidity and pH to predetermined approved levels;
 directing the water flow from said first conduit a first water outlet in the event either of the measured turbidity or pH levels fail to meet the predetermined approved level of turbidity and pH;
 directing the water flow from said first conduit to a second water outlet in the event the measured turbidity and pH levels both meet the predetermined approved levels of turbidity and pH;
 directing the water flow from said first water outlet back to the water source or an alternate location;
 directing the water flow from said second water outlet to and through a second conduit;
 measuring the turbidity and pH level of the water flowing through the second conduit;
 comparing the measured levels of turbidity and pH to predetermined approved standards;
 directing the water from said second conduit to a third water outlet in the event either of the measured turbidity or pH levels in the second conduit fail to meet the predetermined approved standards of turbidity and pH;
 directing the water flow from said second conduit to a fourth water outlet in the event both the measured turbidity and pH levels in the water flowing through the second conduit meet the predetermined approved standards of turbidity and pH;
 directing the water flow from the third water outlet for further processing; and
 directing the water from said fourth water outlet to an off-site clean water collection or distribution site.

39. The method of claim 38 including the additional steps of measuring the volumetric fluid flow of water through said first conduit and injecting a measured amount of a flocculent material into the water flowing through said first conduit; said measured amount being determined based on the measured volumetric fluid flow of water through said first conduit.

40. The method of claim 39 including the additional step of filtering the water directed from said second water outlet to said second conduit.

41. The method of claim 40 including the additional steps of: directing the water from said second water outlet through a sand media filter prior to said water passing through said second conduit; filtering the water directed from said third water outlet and then directing the filtered water back to said second conduit.

42. A portable system for the continuous on-site monitoring and treatment of water comprising:
 a protective enclosure adapted to be positioned proximate a source of collected water, said enclosure containing a water inlet and a plurality of water outlets;
 an internal fluid flow system disposed within said enclosure and comprising a first conduit and a second conduit, said first conduit extending from said water inlet to a first of said water cutoff and to said second conduit, said second conduit extending from said first conduit to a second water outlet and to a third water outlet;

a first probe disposed within said first conduit for measuring a first parameter of the water flowing through said first conduit;

a second probe disposed within said second conduit for measuring said first parameter of the water flowing through said second conduit; and a controller assembly within said enclosure and operatively connected to said probes for receiving from said probes the measured parameters of the water flowing through said conduits, said controller assembly comparing the parameter measured by said first probe with a predetermined acceptable level for said parameter and communicating said water inlet with a first of said water outlets if the parameter measured by said first probe is below said predetermined acceptable level and communicating said inlet with said second conduit if the parameter measured by said first probe meets or exceeds said predetermined acceptable level, said controller assembly further comparing the parameter measured by said second probe in said second conduit with a predetermined acceptable standard for said parameter and communicating said second conduit with a second of said water outlets if the parameter measured by said second probe is below said predetermined acceptable standard and communicating said second conduit with a third of said water outlets if the measured parameter meets or exceeds said predetermined acceptable standard.

43. The portable system of claim 42 including a pump mechanism for delivering water from a source to said first dirty water inlet on said enclosure and through said first and second conduits therein, said pump mechanism being disposed within said enclosure.

44. The portable system of claim 42 including a first control valve assembly in said first conduit selectively communicating said water inlet with said first water outlet or said second conduit and a second control valve assembly in said second conduit selectively communicating said second conduit with said second water outlet or said third water outlet, said control valve assemblies being operatively connected to said controller assembly for actuation by said controller assembly in response to the aforesaid comparison of the measured parameters received from said first and second probes with the predetermined acceptable level and standard.

45. The portable system of claim 42 wherein said controller assembly comprises a first control mechanism operatively connected to said first probe and said control valve assembly in said first conduit and a second control mechanism operatively connected to said second probe and said control valve assembly in said second conduit, said control mechanisms each monitoring and storing the measured parameters received from the probe to which said mechanism is connected whereby a record of the measured parameter in each conduit can be obtained.

46. The portable system of claim 42 wherein said system further comprises a reservoir adapted to contain a supply of water treatment material therein and operatively connected to said first conduit, a pump mechanism for directing a measured amount of water treatment material from said reservoir into said first conduit and a fluid flow monitoring device in said first conduit for measuring the volumetric fluid flow therethrough whereby the amount of water treatment material to be delivered from said reservoir into said first conduit can be determined.

47. The portable system of claim 42 wherein the parameter measured by said first and second probes is the turbidity level of the water and wherein said water treatment material comprises a flocculent material.

48. The portable system of claim 42 including a filter in said second conduit.

49. The portable system of claim 48 wherein said filter in said second conduit is a sand media filter.

50. The portable system of claim 42 wherein the parameter measured by said first and second probes is the turbidity level of the water and wherein said water treatment material comprises a flocculent material and including a sand media filter in said second conduit.

51. The portable system of claim 50 wherein said second conduit defines a length of at least about 80 feet between said first conduit and said sand media filter.

52. The portable system of claim 42 wherein said system additionally includes third and fourth probes for measuring the pH levels in fluids, said third probe being disposed in said first conduit and said fourth probe being disposed in said second conduit, said third and fourth probes being operatively connected to said controller assembly such that said controller assembly receives from said third and fourth probes the measured pH levels of water flowing through said first and second conduits, said controller assembly comparing the pH level measured by said third probe with a predetermined acceptable pH range and actuating said first control valve assembly to communicate said water inlet with said first water outlet if the pH level measured by said third probe is outside said predetermined acceptable range or to communicate said dirty water inlet with said second conduit if the pH level measured by said third probe is within said range and the turbidity level measured by said first probe meets or exceeds said predetermined acceptable level, said controller assembly further comparing the pH level measured by said fourth probe with said predetermined acceptable range and actuating said second control valve assembly to communicate said second conduit with said second water inlet if the pH level measured by the fourth probe is outside said predetermined acceptable range or to communicate said second conduit with said third water outlet if the measured pH level is within said predetermined acceptable range and the turbidity level measured by said second probe meets or exceeds said predetermined acceptable standard.

53. A portable system for the continuous on-site monitoring and treatment of water comprising:

a protective enclosure adapted to be positioned proximate a source of collected water, said enclosure containing a water inlet and a plurality of water outlets;

an internal fluid flow system disposed within said enclosure and comprising a first conduit and a second conduit, said first conduit extending from said water inlet to a first of said water outlets and to a second conduit, said second conduit extending from said first conduit to a second water outlet and to a third water outlet;

a first probe disposed within said first conduit for measuring a first parameter of the water flowing through said first conduit;

a second probe disposed within said second conduit for measuring said first parameter of the water flowing through said second conduit; and a controller assembly disposed within said enclosure and operatively connected to said first and second probes for receiving data from said probes regarding the measured parameters of the water flowing through said first and second conduits, said controller assembly comparing the measured parameters with predetermined acceptable levels for water flowing through said first and second conduits and selectively communicating said first and second conduits with one of said water outlets in response to the comparisons of the measured parameters with said predetermined acceptable levels.

54. The portable system of claim 53 wherein the parameter measured by said first and second probes is the turbidity level of the water and wherein said water treatment material comprises a flocculent material.

55. The portable system of claim 53 wherein said system additionally includes third and fourth probes for measuring the pH levels in fluids, said third probe being disposed in said first conduit and said fourth probe being disposed in said second conduit, said third and fourth probes being operatively connected to said controller assembly such that said controller assembly receives from said third and fourth probes the measured pH levels of water flowing through said first and second conduits, said controller assembly comparing the pH level measured by said third probe with a predetermined acceptable pH range and communicating said water inlet with said first water outlet if the pH level measured by said third probe is outside said predetermined acceptable range and communicating said dirty water inlet with said second conduit if the pH level measured by said third probe is within said range and the turbidity level measured by said first probe meets or exceeds said predetermined acceptable level, said controller assembly further comparing the pH level measured by said fourth probe with said predetermined acceptable range and communicating said second conduit with said second water inlet if the pH level measured by the fourth probe is outside said predetermined acceptable range and communicating said second conduit with said third water outlet if the measured pH level is within said predetermined acceptable range and the turbidity level measured by said second probe meets or exceeds said predetermined acceptable standard.

56. A portable system for the continuous on-site monitoring of water comprising:

a protective enclosure adapted to be positioned proximate a source of collected water, said enclosure containing a water inlet and a water outlet;

an internal conduit extending through said enclosure and communicating said water inlet with said water outlet;

a main water flow conduit adapted to be communicated with a source of water, said main water flow conduit defining a water inlet and, a dirty water outlet and a clean water outlet end;

a pump assembly for directing water from the source to and through said main water flow conduit;

an upstream connector line communicating said main water flow conduit with said water inlet on said enclosure;

a downstream connector line communicating said water outlet on said enclosure with said main water flow conduit;

a valve disposed in said main flow conduit for diverting a portion of the water flowing through said main water flow conduit into and through said internal conduit and back into said main water flow conduit through said downstream connector line;

a first probe disposed within said internal conduit for measuring a first parameter of water flowing through said first conduit;

a second probe disposed within said internal conduit for measuring a second parameter of water flowing through said internal conduit; and a controller assembly disposed within said enclosure and operatively connected to said first and second probes for receiving data from said probes regarding the measured parameters of the water flowing through said internal conduit, said controller assembly comparing the measured parameters with predetermined acceptable levels for said parameters and selectively communicating said water inlet end of said main water flow conduit with said dirty water outlet end if the parameters measured by either of said probes fail to meet said predetermined acceptable levels for said parameters and communicating said water inlet end of said main flow conduit with said clean water outlet end if the parameters measured by said probes both meet or exceed said predetermined acceptable levels.

57. The portable system of claim 56 including a control valve in said main water flow conduit proximate said dirty water outlet end thereof selectively communicating said water inlet end of said main water flow conduit with said dirty water outlet end thereof and a second control valve in said main water flow conduit proximate said clean water outlet end thereof selectively communicating said water inlet end of said main water flow conduit with said clean water outlet end thereof, said control valves being operatively connected to said controller assembly for actuation by said controller assembly in response to the aforesaid comparison of said measured parameters with said predetermined acceptable levels for said parameters.

58. The portable system of claim 56 including a control valve assembly in said main water flow conduit for selectively communicating said water inlet end of said main water flow line with said dirty water outlet end thereof or said clean outlet end thereof in response to the aforesaid comparison of said measured parameters with said predetermined acceptable levels for said parameters.

59. The portable system of claim 56 wherein the parameter measured by said first probe is the turbidity level of the water and the parameter measured by said second probe is the pH level of the water.

* * * * *